United States Patent [19]

Templeton

[11] Patent Number: 4,890,914

[45] Date of Patent: Jan. 2, 1990

[54] HYBRID LENS APPARATUS USED FOR SHEAROGRAPHIC ANALYSIS

[75] Inventor: Douglas W. Templeton, Macomb County, Mich.

[73] Assignee: The United States of America as represented by the Secretary of the Army, Washington, D.C.

[21] Appl. No.: 295,674

[22] Filed: Jan. 11, 1989

[51] Int. Cl.[4] .......................... G01B 11/16; G01B 9/02; G02B 3/14
[52] U.S. Cl. .................................. 356/35.5; 73/800; 350/419; 356/353
[58] Field of Search ...................... 356/32, 35.5, 353; 350/418, 419; 73/800

[56] References Cited

U.S. PATENT DOCUMENTS

| 3,161,718 | 12/1964 | DeLuca | 350/419 |
| 3,606,523 | 9/1971 | Taylor et al. | 350/418 |
| 4,139,302 | 2/1979 | Hung et al. | 356/32 |

Primary Examiner—Vincent P. McGraw
Attorney, Agent, or Firm—Peter A. Taucher; David L. Kuhn

[57] ABSTRACT

A lens system for the production of shearographic images is disclosed together with the method for using the lens system.

17 Claims, 6 Drawing Sheets

PRIOR ART
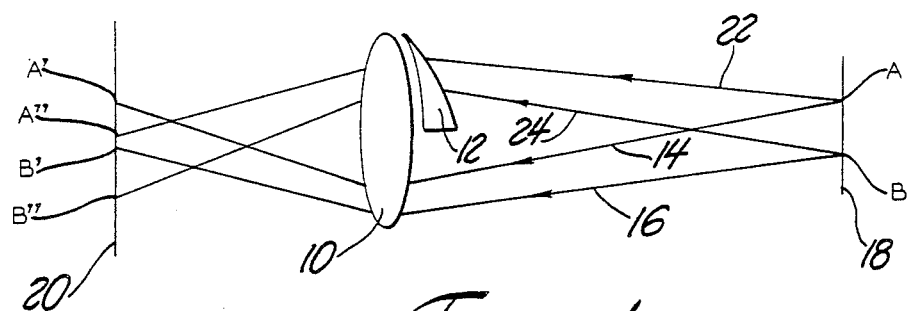
Fig. 1
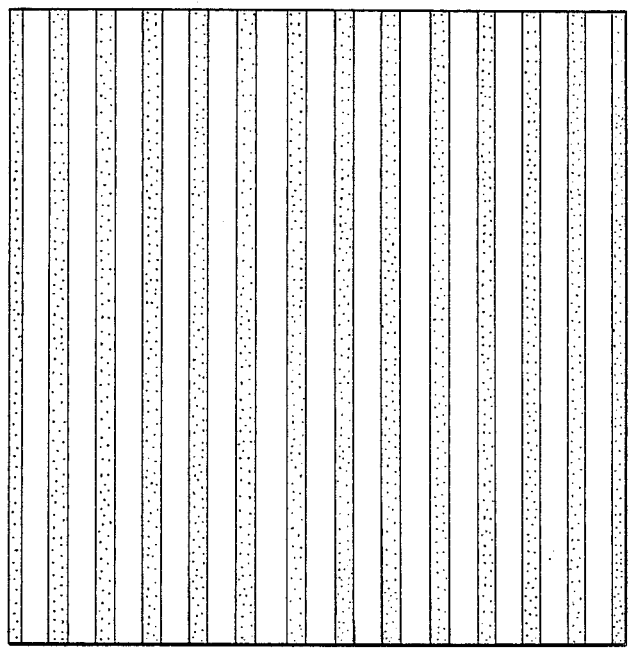
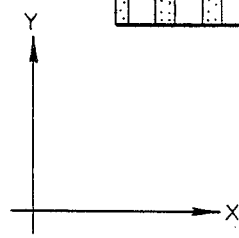
Fig. 3

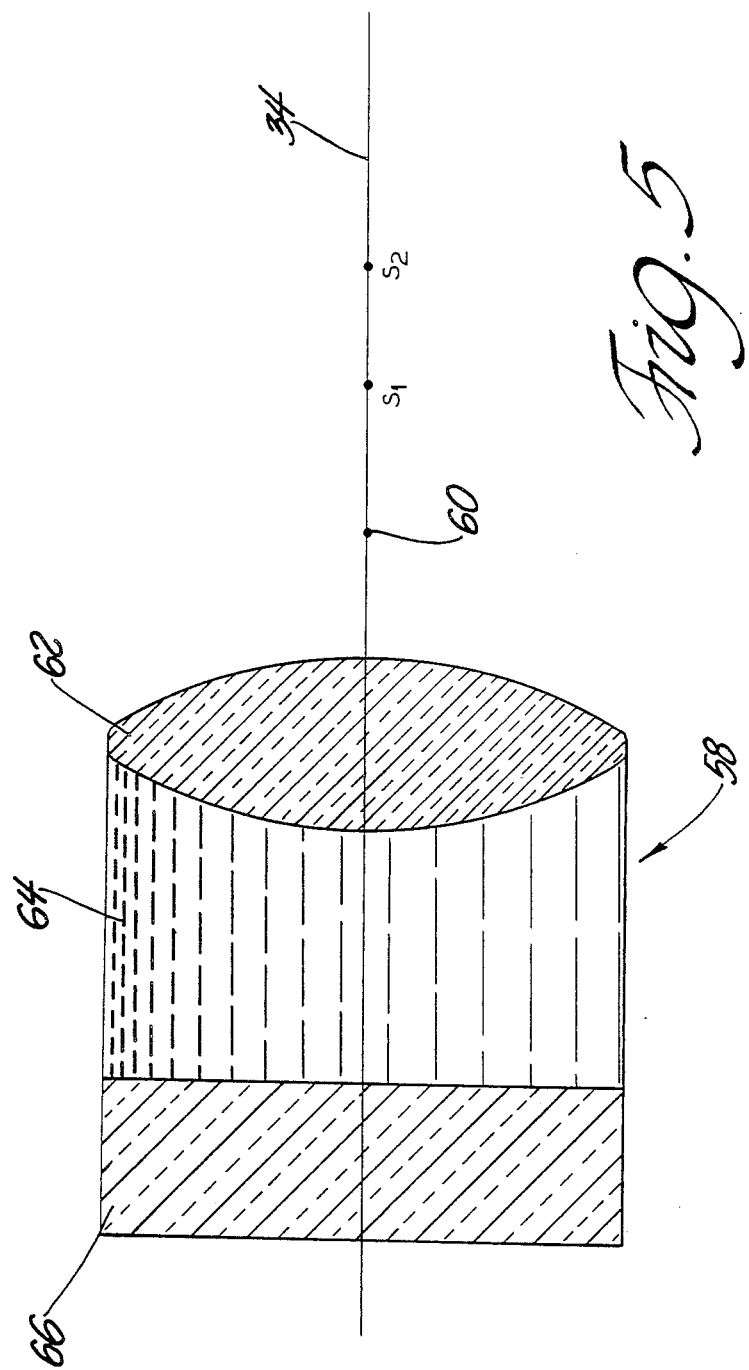

HYBRID LENS APPARATUS USED FOR SHEAROGRAPHIC ANALYSIS

GOVERNMENT INTEREST

The invention described herein may be manufactured, used, and licensed by or for the Government for governmental purposes without payment to me of any royalty thereon.

BACKGROUND

The invention taught herein is an improved optical apparatus useful in a shearographic technique for ascertaining the flexural strain of an object that has been subjected to stress.

In recent years, a number of optical methods have been developed to measure or analyze the strain of objects under stress. One of these, a shearographic technique, has been shown by Hung et al. in U.S. Pat. No. 4,139,302, where an image shearing camera was used whose lens arrangement is shown in FIG. 1 herein. The arrangement includes a conventional double convex lens 10 and a wedge shaped lens 12 covering one-half of lens 10. The lower, uncovered half of lens 10 receives light rays 14, 16 coming from respective points A and B on object 18, which has been illuminated with coherent light. Lens 10 refracts rays 14, 16 to points A' and B' on a planar photosensitive surface such as film 20. Other light rays 22, 24 coming from points A and B pass through wedge shaped lens 12 before passing through double convex lens 10, whereby rays 22, 24 are refracted twice before striking film 20, and land at points A" and B" on the film. Two images of line AB will be formed on film 20, one image being line A'B' and the other image being A"B". These images will be vertically offset from each other in FIG. 1, and the image of Line AB is said to be sheared in the vertical direction. From the foregoing discussion, it will be understood that the entire image of object 18 will be sheared in the vertical direction. The light waves form the two images interfere to form a fringe pattern, or interferogram, on film 20.

To use the image shearing camera for strain analysis, Hung et al. create a first interferogram of an object in the manner above described. The object is then subjected to a stress. Then a second interferogram is taken of the object using the same film 20, while keeping the camera, light source and object in the same positions as before. Film 20 is thus subjected to a double exposure, one exposure for the pre-stress interferogram and the other exposure being for the post-stress interferogram, so that film 20 now has a third, resultant interferogram. The resultant interferogram is filtered by a high-pass Fourier filter to produce an interference pattern visible to the naked eye. The shape and spacing of this interference pattern are analyzed to determine the shape of the strained area of the object.

Another method of strain measurement using shearography was shown by Takezaki and Hung in their article, "Direct Measurement of Flexural Strains in Plates by Shearography" (American Society of Engineers paper 85-WA/APM-18, pub. 1985). Takezaki and Hung use the apparatus schematically shown at FIG. 2. Camera 26 is a shearographic camera having a wedge shaped lens 28 covering one half of the camera lens 30. Plate 32 is the object whose flexural strain is to be determined. Plate 32 is illuminated by a point source of coherent light located within the focal length of a translatable lens (not shown) such that a virtual image of the light source is formed at virtual source S1. S1 can be regarded as the center of a spherical wavefront emanating from the point light source toward the plate 32. An individual ray of this wavefront is represented by line W1. The translatable lens can be moved along line 34 normal to plate 32 so that the virtual image of the light source is shifted from virtual source S1 to virtual source S2. S2 then becomes the center of a second spherical wavefront, an individual ray of which is represented by line W2.

In the method of Takezaki and Hung, the first step is to illuminate the plate 32 by spherical light waves centered at S1. These light waves reflect from plate 32 toward shearographic camera 26. The wavefronts entering camera 26 are sheared in the x direction (as seen in FIG. 2) by the action of lenses 28 and 30. The light waves strike a sheet of photosensitive material such as film 42 in the image plane of the camera. The second step of the Takezaki/Hung method is to move the translatable lens along line 34 so that S2 becomes the center of the spherical light wave emanating from the point light source toward plate 32. The translation of the virtual source from S1 to S2 causes a phase shift of the wavefront across the surface of plate 32. The phase shifted wavefront reflects off plate 32 and enters camera 26, which forms another sheared image of plate 32 on film 42. Film 42 will now have two sheared images of plate 32, which are superimposed on one another to form a composite shearographic image. The composite shearographic image will typically be comprised of fringes so narrow and closely spaced that the fringe pattern will not be visible to the naked eye. A microscope may be used to view the composite shearographic image in order to analyze it. Normally, however, the composite shearographic image is rendered visible to the naked eye by processing film 42 (with the composite shearographic image thereon) through a fringe-frequency discirminatory filter, as shown in FIG. 4 of U.S. Pat. No. 4,139,302 to Hung et al.

Assuming that plate 32 has no out-of-plane deformation, the two sheared images will result in a composite shearographic image similar to that shown in FIG. 3. The composite shearographic image will be a pattern comprised of parallel straight fringes equally spaced from one another. The fringes will extend perpendicular to the x (shearing) direction. If plate 32 is deformed in a direction normal to its general plane, the fringes will not be perfectly straight in the area of the deformation. The spacing between the fringes, or pitch, will vary in direct proportion to the flexural strain of the plate 32. The value of the variations is used to calculate the plate's flexural strain.

A recently developed optical method for flexural strain determination advances the Takezaki-Hung technique and is hereafter referred to as the Templeton-Hung technique to distinguish it from other optical techniques discussed herein. Aspects of the Templeton-Hung technique are discussed in a technical publication entitled *Proceedings of SPIE*, No. 814, pp. 116–123, 1987). The Templeton-Hung technique basically involves making a first composite shearographic image of an object whose flexural strain is to be measured, this composite image being made essentially according to the Takezaki-Hung method described above. Next, the object is subjected to a stress. A second composite shearographic image of the object is made while the object is under stress. The pre-stress and post-stress composite images are compared and the changes in the fringe order value for individual points on the object are determined. The change in fringe order value is directly proportional to the term $(\delta w)/(\delta x)$, where w is the component of deformation in the z direction in FIG. 2 (i.e., parallel to the line of sight between the object and the camera) and x is distance in the shearing direction. The sign of the value $(\delta w)/(\delta x)$ tells whether the object is deflecting toward or away from the camera. The value of $(\delta w)/(\delta x)$ is used to determine the flexural strain at individual points on the plate.

SUMMARY

The invention herein is a hybrid lens that replaces the translatable lens discussed in conjunction with FIG. 2, the hybrid lens being capable of shifting the virtual light source from point S1 to point S2 in that figure. The hybrid lens shifts the virtual light source without moving the light source or the hybrid lens itself, thereby avoiding difficulties in precisely shifting these elements between exactly predetermined locations. The hybrid lens assembly includes a chamber, a first lens on one side of the chamber, and a thin planar window on the other side of the chamber. Between the lens and window is a clear fluid having a given index of refraction, this fluid acting as the second lens of the hybrid lens assembly. The assembly includes a means to exchange the fluid in the chamber with another clear fluid having a different index of refraction, thereby causing a change in position of the virtual light source.

BRIEF DESCRIPTION OF THE DRAWINGS

FIG. 1 shows a lens structure for making shearographic images.

FIG. 3 shows a typical filtered shearographic image of an undeformed plate taken by the arrangement of FIG. 2.

FIG. 5 is a hybrid lens used in a shearographic method of measuring flexural strain.

THE TEMPLETON-HUNG METHOD

Figure 2:
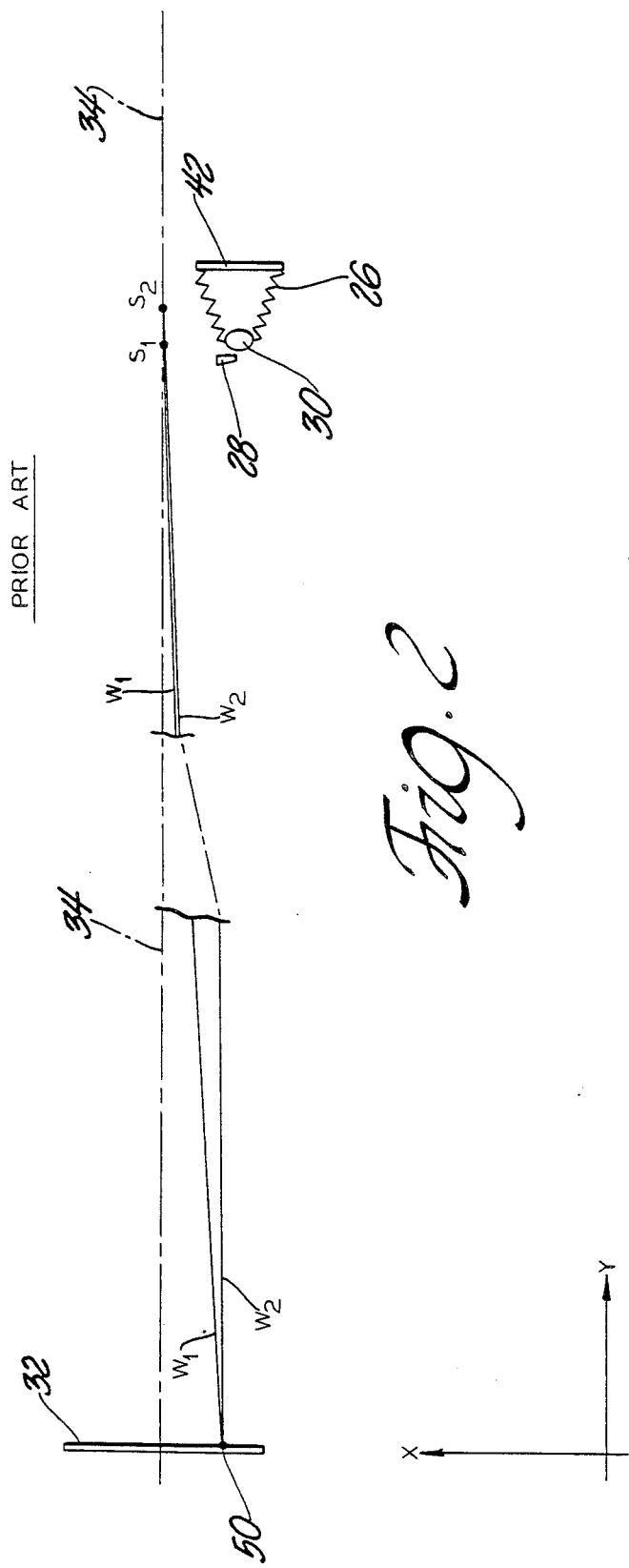
FIG. 2 is an arrangement for making a shearographic image of a plate.
Figure 4:
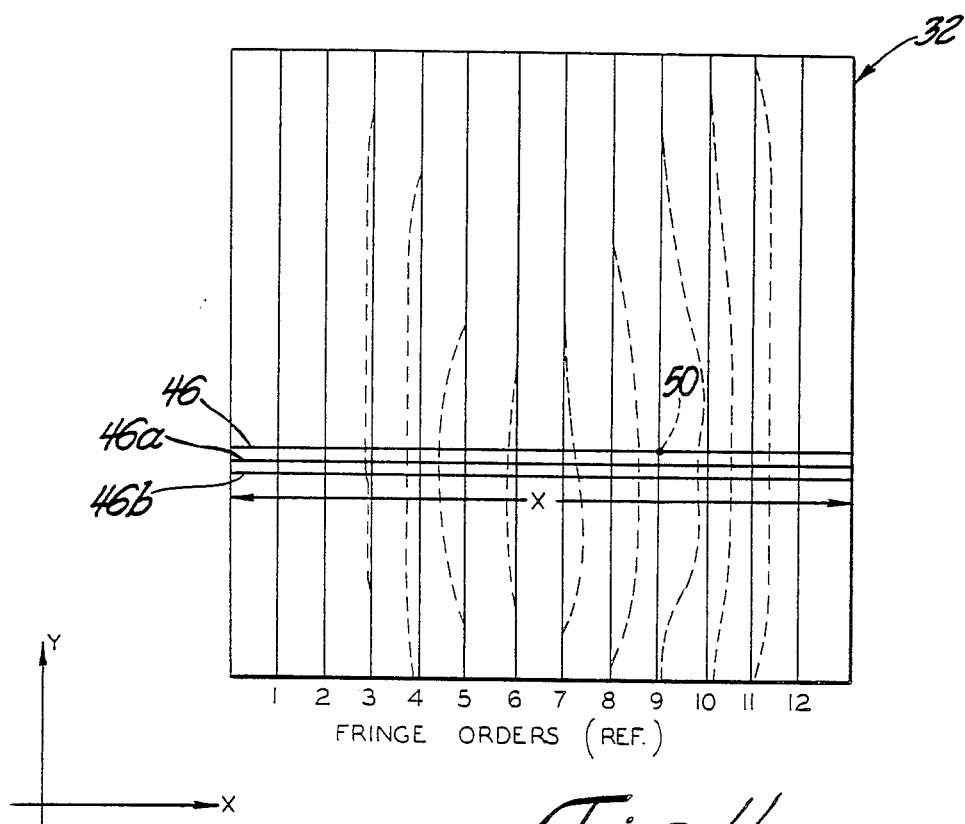
FIG. 4 shows the movement of fringe centerlines in a composite shearograph caused by deformation of the plate.

For purposes of explanation, the Templeton-Hung method of determining the flexural strain on an object may be discussed in terms of the illustration in FIG. 4. In FIG. 4, the solid vertical lines represent the centerlines of fringes created as a result of the pre-stress composite shearograph of plate 32. The x direction in FIG. 4 is the direction of shearing of camera 26. The order numbers of the fringes in the shearograph increase monotonically in the positive x direction (right, in FIG. 4) and the centerlines of these fringes are accordingly assigned sequentially increasing numbers, 1 through 12. When plate 32 is deformed by a stress directed at one of its faces and a post stress composite shearograph is made, portions of some fringes will move. Centerlines of the displaced fringe portions are shown by dashed lines.

After the pre-stress and post-stress composite shearographs of plate 32 are completed, and the centerlines of fringes in these shearographs are placed, the next step is to pick a number of points along a line parallel to the shearing (x) direction in an area of interest on plate 32. In FIG. 4, points along line 46 are selected. For convenience, one may pick points, such as point 50 in FIG. 4, which lie on a pre-stress fringe centerline. For each of the selected points, the pre-stress and post-stress fringe order numbers are determined. Using point 50 as an example, one can see that its pre-stress fringe order value would be 9. The post-stress fringe order value for point 50 is determined by noting the distance along line 46 between it and the post-stress fringe centerlines. In FIG. 4, line 50 is approximately one-third of the way from post-stress fringe centerline 8 to post-stress fringe centerline 9, so point 50 would be assigned a post-stress fringe order number of approximately 8.3. The strain on plate 32 has thus caused point 50 to undergo a fringe order change of $-0.7$. The negative sign of the fringe order change denotes that plate 32 deforms away from the viewer in FIG. 4 as one proceeds to the right, in the positive x direction. It is a unique feature of the Templeton-Hung method that the sign of the fringe order change can be used to determine the direction of deflection at any point on the plate (toward or away from the viewer) as one proceeds in the shearing direction on the plate.

As is more fully explained below, the fringe order change of point 50 can be used to find the value for $(\delta w)/(\delta x)$ at point 50. As is well known, the flexural strain of a plate at a given point is directly related to the second derivative of out-of-plane deflection at that point. Thus, under the Templeton-Hung method, flexural strain can be calculated using the formula:

$$\epsilon_x = h \frac{\partial^2 w}{\partial x^2}$$

where $\epsilon_x$ is the flexural strain relative to the x direction and h is the distance from the neutral plane of the plate to the point on the plate's surface which is under consideration. A plot of flexural strain versus position along line 46 in FIG. 4 can be generated. Similar plots can be generated for any line parallel to line 46, such as lines 46a and 46b.

To determine flexural strain where image shearing in the y direction is used, the formula:

$$\epsilon_y = h \frac{\partial^2 w}{\partial y^2}$$

is used, being the flexural strain of the plate with respect to the y direction.

MATHEMATICAL DERIVATION FOR THE TEMPLETON-HUNG METHOD

Background information for the mathematical basis upon which the Hung-Templeton method is premised can be found in paper 85-WA/APM-18 mentioned earlier.

For the pre-stress composite shearograph, the total light intensity is given by the formula:

$$I_r = 4a^2 \left[ 1 + \cos\left(\frac{2\phi_x + \Delta x}{2}\right) \cos\frac{\Delta x}{2} \right] \tag{1}$$

where:

$I_T$ = light intensity, a = amplitude of coherent light wave used, $\phi_x$ = the phase angle difference between non-sheared light waves at the image plane of the image shering camera 28, and $\Delta_x$ = the change in $\phi_x$ created by shifting the virtual image from S1 to S2.

The bracketed term in the above equation represents a high frequency carrier wave of amplitude $$\cos\left(\frac{2\phi_x + \Delta x}{2}\right)$$

modulated by the low frequency factor $$\cos\frac{\Delta x}{2}.$$

The high frequency carrier wave is nulled when $$\cos\frac{\Delta x}{2} = 0,$$

that is, when $\Delta_x = (2n+1)\pi$, where n is an integer. It has also been shown that $$\Delta_x = (2n + 1)\pi = \frac{2\pi}{\lambda} (k_1 x)\delta x, (n = 1,2,3 \ldots) \tag{2}$$

where $\lambda$ is the wavelength of the point light source, x is the movement in the x direction in FIG. 4 and $\delta\chi$ is the magnitude of the shearing, which is also in the x direction. The constant $k_l$ has a value given by:

$$k_1 = \frac{R_s - R_d}{R_s R_d} \tag{3}$$

where $R_s$ is the distance between the virtual image S1 and the point (such as point 50) on plate 32 which is under consideration, and $R_d$ is the distance between S2 and this point on plate 32.

Equation 2 represents a fringe pattern of the frequency variation type. The fringe pattern characterized by equation (2) is not visible to the eye but can be converted to a visible pattern by such means as a Fourier filter described in the previously mentioned patent to Hung. The filtered pattern consists of periodic parallel fringes, as would be predicted by the fact that equation (2) is a linear function with respect to the x direction.

When plate 32 deforms and a post-stress composite shearograph is created of the plate, a new phase angle shift, $\Delta_x'$, is caused by deformation of the plate. $\Delta_x'$ can be given by the formula:

$$\Delta'_x = \frac{2\pi}{\eta} \left( k_1 x + A \frac{\partial \mu}{\partial x} + B \frac{\partial v}{\partial x} + C \frac{\partial w}{\partial x} \right) \delta x \tag{4}$$

where $(\delta u)/(\delta x)$, $(\delta v)/(\delta x)$ and $(\delta w)/(\delta x)$ are the respective first derivatives (with respect to the x, or shearing, direction) in the x, y, and z directions of the deformations of the plate. Of course, in nondeformed areas of the plate, $\Delta_x'$ will be equal to $\Delta_x$. A, B and C are sensitivity factors which are a function of the two light source positions, the camera position, and the location of the point being considered (e.g., point 50) on the object whose strain is being measured.

The total light intensity of a point on the post-stress shearograph is given by the formula:

$$I'_T = 4a^3 \left[ 1 + \cos\left(\phi_x + \frac{\Delta'_x}{2}\right) \cos\frac{\Delta'_x}{2} \right] \tag{5}$$

Similarly to equation (1) above, the bracketed term in equation (5) represents a high frequency carrier wave modified by the low frequency factor $$\cos\frac{\Delta'_x}{2}$$

The high frequency carrier wave is nulled when $$\frac{\Delta_x}{2} = 0,$$

i.e., when $\Delta_x' = (2n+1)\pi$. When $\Delta_x' = (2n+1)\pi$, equation 4 becomes:

$$\Delta'_x = (2n + 1)\pi = \tag{6}$$

$$\frac{2\pi}{\eta} \left( k_x x + A \frac{\partial \mu}{\sigma x} + B \frac{\partial v}{\partial x} + C \frac{\partial w}{\partial x} \right) \delta x$$

Equation (6) represents the linear fringe pattern of equation (2) with the displacement derivatives $((\delta u)/(\delta x)$, $(\delta v)/(\delta x)$ and $(\delta w)/(\delta x)$ ) superimposed on the linear fringe pattern. For convenience in the use of the Templeton-Hung method, I prefer an optical arrangement such that the illumination and viewing directions are normal, or essentially normal to all points on the plate. Specifically, the viewing and illumination angles should preferably be no more than 5 degrees from a normal to the plate at a point on the plate (again, such as point 50) which is being considered. I also prefer that the shearing direction of camera 26 be parallel to the x-axis. With this arrangement, and under the condition that the plate deformation in the x and y directions are minimal relative to deformation in the z direction, the sensitivity factors A and B to go to 0 or very nearly 0, so that the terms A and B in equation (6) can be ignored. At the same time, factor C will be 2 or very nearly 2. Equation (6) can then be reduced to:

$$\Delta'_x = (2n + 1)\pi = \frac{2\pi}{\eta} \left( k_1 x + 2 \frac{\partial w}{\partial x} \right) \delta x \tag{7}$$

In this case (when the plate has been deformed), the observed fringes will not be perfectly parallel periodic fringes. Rather, these fringes will be perturbed by the deformation strain of plate 32, the deformation being represented by the term $2(\delta w)/(\delta x)$ in equation (7).

Equation (7) can be rewritten as:

$$AN^*\pi = \frac{2\pi}{\eta}\left(k_1x + 2\frac{\partial w}{\partial x}\right)\delta x \quad (8)$$

In similar fashion, equation (2) can be rewritten as:

$$AN\pi = \frac{2\pi}{\eta}\delta x \quad (9)$$

where AN and AN* are the fringe order values before and after plate deformation for any point on the plate. Subtracting equation (9) from equation (8) yields:

$$(AN^* - AN)\pi = \frac{2\pi}{\eta}\left(2\frac{\partial w}{\partial x}\right)\delta x \quad (10)$$

For a given point on the object's surface, equation 10 shows that the fringe order difference, AN*−AN, between pre-stress and post-stress shearographs of plate 32 gives the z deflection derivative with respect to the shearing direction. The term $\delta\chi$ is a constant representing the magnitude of shearing in the x direction, this term being governed by the shape, composition, and location of shearing lens 28. The value for the quantity AN*−AN can be measured or graphically determined by the method previously explained with respect to FIG. 4, for example. In practice, however, it is preferred to digitize the pre-stress and post-stress composite shearographs and feed the digitized information to computer memory, the computer being able to generate graphs depicting fringe order change versus movement in the shearing direction. This can be done for any number of lines parallel to the shearing direction. It is also feasible for a computer program to generate graphs of flexural strain versus location on a line parallel to the shearing direction on the plate.

THE INVENTION: AN APPARATUS FOR SHIFTING VIRTUAL IMAGE OF POINT SOURCE

The preferred device for shifting the virtual image of the point source is shown in FIG. 5, where the point light source 60 is located along line 34 along the axis of hybrid lens 58 within the focal length of lens 58. Hybrid lens 58 is comprised of a conventional double convex lens 62, a window 66 and a fluid filled cell 64 sandwiched therebetween. When the first, pre-stress composite shearograph of an object is being made, cell 64 is filled with a first fluid having a relatively lower index of refraction. This fluid could be air or oxygen, for example. The location of the virtual image of the light source will be at S1. Before the second, post-stress composite shearograph of the object is made, cell 64 is filled with another fluid having a second, relatively higher index of refraction such as water or alcohol. The new, higher index of refraction for cell 64 increases the focal length of hybrid lens 58 and shifts the virtual image of the point source from S1 to S2. The second post-stress composite shearograph is then made, and the pre-stress and post-stress shearographs are compared and analyzed as previously described.

Figure 6:
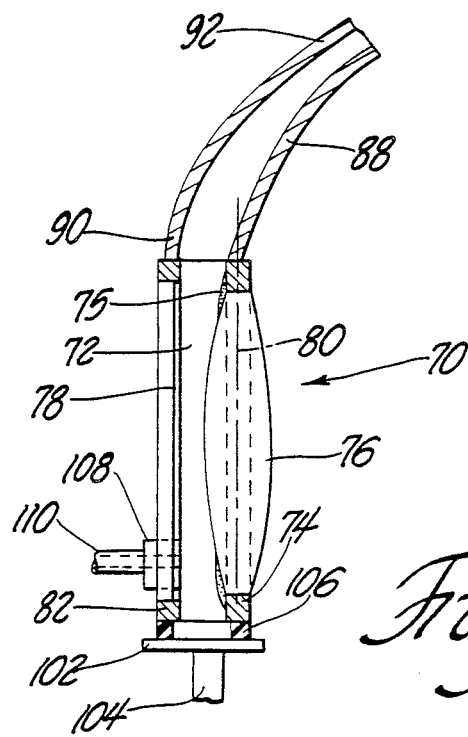
FIGS. 6 and 7 show an optical apparatus incorporating a hybrid lens, FIG. 6 being a view taken along line 6—6 in FIG. 7.
Figure 7:
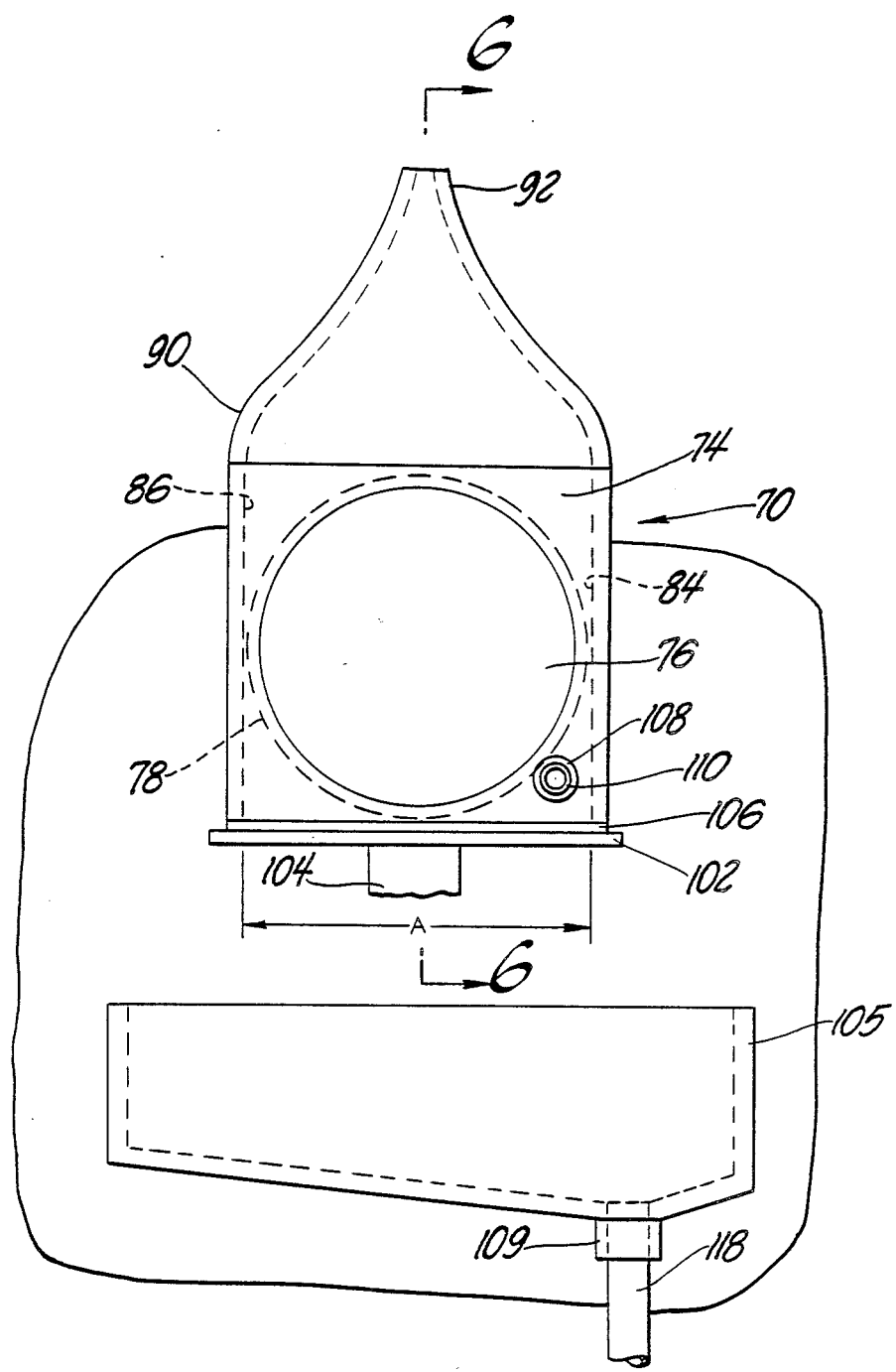

An optical apparatus 70 incorporating my hybrid lens is shown in FIGS. 6 and 7, the apparatus including a sealed, generally planar, multi-ported chamber 72. One side of the chamber is defined by a square-shaped lens frame 74 and a double convex optical lens 76 centered and fixed within the frame, the diameter of lens 76 preferably being at least 80 percent as long as one of the sides of lens frame 74. An annular seal 75 may be adhered inside the chamber at the interface between lens 76 and frame 74, seal 75 being shaped so that it forms a smooth, continuous surface with lens 76 and frame 74 so as not to cause turbulence in fluid flowing vertically through chamber 72. The other side of chamber 72 includes a thin planar window 78 parallel to principle plane 80 of lens 76. Window 78 is centered and fit within a square-shaped frame 82, which has a configuration similar to that of lens frame 74, window 78 having a diameter at least 80 percent as long as one side of the window frame. Between the frames 74 and 82 are long narrow walls 84, 86 parallel to each other and sealed to the edges of the frames.

Sealingly engaged to the top of chamber 72 is a fluid communication duct 88 having a narrow rectangular cross section at one end 90 to fit conformingly onto the top of chamber 72. The other end 92 of duct 88 has a generally circular cross section, the duct gradually changing cross-sectional shape from the one end 90 to the other end 92. Duct 88 is part of line 94 (FIG. 8) communicating chamber 72 with two-way valve 96, by which chamber 72 can be fluidically connected to either pressurized gas source 98 or exhaust vent 100.

Forming the bottom of chamber 72 is a door 102 which is vertically translated by a shaft 104 to engage or disengage seal 106, the seal being attached along the bottom edges of walls 84 and 86 and frames 74 and 82 to form a narrow rectangular opening having the same shape as the rectangular cross section at end 90 of duct 88. When door 102 is translated downward, liquid in chamber 72 falls into basin 105 and drains through fitting 109 into liquid return line 118. Near the bottom of chamber 72 is a fluid entry fitting 108 by which liquid from liquid supply line 110 enters chamber 72.

Figure 8:
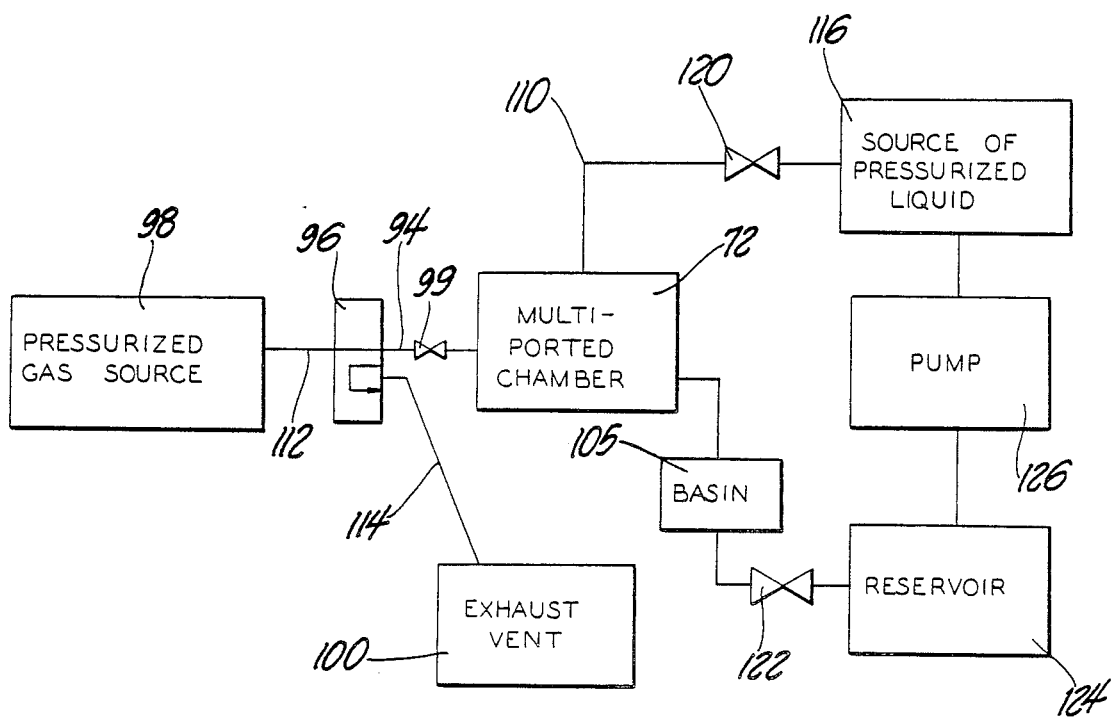
FIG. 8 is a schematic flow diagram showing the hydropneumatic system of which the optical apparatus is part.
Figure 8A:
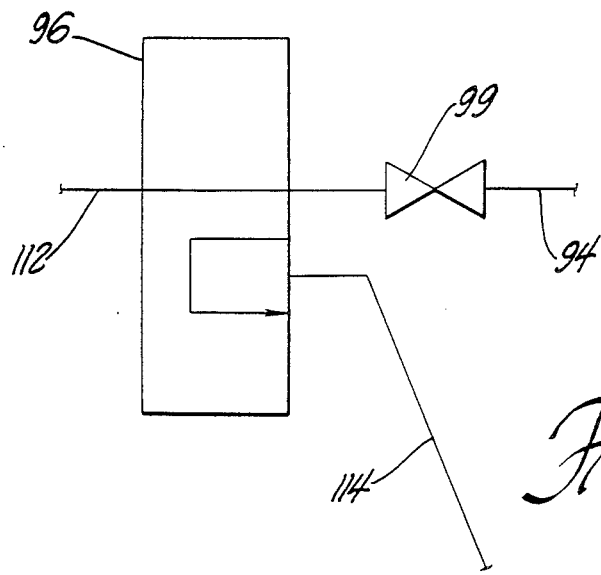
FIG. 8a is a second schematic view of a two-way valve shown in FIG. 8.

FIG. 8 shows the hydro-pneumatic system of which chamber 72 is part. Chamber 72 communicates with a two-way valve 96 via line 94, and valve 96 in turn communicates with pressurized gas source 98 and exhaust vent 100 via lines 112 and 114, respectively. Valve 96 has two positions, the first of which is schematically shown in FIG. 8, whereas the second position of the valve is schematically shown in FIG. 8a. When valve 96 is in its first position it opens chamber 72 to pressurized gas source 98 and shuts chamber 72 off from exhaust vent 100. An optional pressure control valve 99 may be placed in line 94 to shut off gas from source 98 to chamber 72 when pressure in chamber 72 reaches a selected amount. When valve 96 is in its second position, it opens chamber 72 to exhaust vent 100 and shuts chamber 72 off from pressurized gas source 98.

Chamber 72 is hydraulically connected with a source of pressurized liquid 116 through line 110, which has a shut-off valve 120 therein. As shown in FIG. 8, liquid entering basin 105 from chamber 72 may drain into line 118 and pass through closure valve 122 before entering a reservoir 124. Pump 126 receives liquid from reservoir 124 and sends the liquid to source 116, which is maintained at a selected pressure, say 30 psi, by the pump.

In operation, chamber 72 of optical apparatus 70 is repeatedly emptied of one fluid and filled with another in the process of making the varius shearographs discussed previously. Preferably, the first exposure for the pre-stress shearograph is taken while chamber 72 is filled with a gas such as air or oxygen. When gas is being retained in chamber 72, door 102 closes the bottom of the chamber, valve 96 is in the FIG. 8 position so that chamber 72 receives pressurized gas, and shut off valve 99 is closed. To prepare apparatus 70 for taking the second exposure of the pre-stress shearograph, two-way valve is placed in its FIG. 8a position where so that chamber 72 is vented and is simultaneously cut off from pressurized gas source 98. Valve 120 is opened temporarily so that a predetermined volume of fluid is admitted to chamber 72, the volume of liquid being sized to cover lens 76 and window 78 without entering duct 88. The liquid displaces the gas previously in chamber 72 and the displaced gas escapes through line 114 and vent 100. Apparatus 70 is ready for the second pre-stress shearograph exposure and can also now be used for a first post-stress shearograph exposures.

After the desired exposure or exposures are made with liquid in chamber 72, the chamber is emptied by translating door 102 away from the chamber, so that liquid is dumped into basin 105. Simultaneously, two-way valve 96 switches from its FIG. 8a position to its FIG. 8 position, whereby pressurized gas blows through chamber 72. The gas is dry and it is blown through chamber until liquid residue in the chamber is evaporated and preferably until the purity of the gas (or in the case of air, a gas mixture) in the chamber is essentially 100%. The stream of gas through chamber 72 is relatively nonturbulent since it has the same cross section as it enters and leaves the chamber and since seals 75 form a continuous, smooth surface inside the chamber with frame 74 and lens 76, and since window 78 is flush with the inner surface of frame 82. The distance between lens 76 and window 78 can be controlled so that the inner, curved surface of lens 76 does not appreciably restrict the gas stream or cause turbulence therein. The smooth flow of the gas stream through chamber 72 is intended to increase the speed and efficiency with which liquid residue is forced out or evaporated from the chamber.

Once the liquid residue has been removed from chamber 72, door 102 is translated upward into sealing engagement with the bottom of the chamber. When a predetermined pressure in the chamber has been reached, valve 99 is closed. The remaining exposure for the post-stress composite shearograph can now be taken. For additional shearographic exposures, the fluid in chamber 72 can be alternated between gas and liquid as above detailed.

In some applications of apparatus 70, it may be desirable to minimize the vertical dimension of chamber 72 relative to the size of lens 76 or window 78, whichever has the larger diameter. Such minimization decreases the volume of fluid in chamber 72 which must be replaced when substituting the gas therein with a liquid or vice versa. The fluid replacement time can thereby be advantageously reduced, say, when apparatus 70 is used for rapid, repeated testing in a mass production setting.

To minimize the volume of chamber 72 as shown in FIGS. 6 and 7, the vertical dimension of window frame 82 is equal, or approximately equal, to the vertical diameter of window 78. The horizontal, wall-to-wall dimension "A" of frame 82 is equal to the horizontal diameter of window 78. If the lens 76 has a larger diameter than window 78, then lens frame 74 will be dimesioned according to the horizontal and vertical diameters of lens 76. Frames 82 and 74 will have equal horizontal and vertical dimensions whether lens 76 has a greater diameter than window 78 or whether the reverse is true.

I wish it to be understood that I do not desire to be limited to the exact details of the methods and constructions of my invention shown and described herein, because obvious modifications will occur to those skilled in the relevant art without departing from the spirit and scope of the following claims.

I claim:

1. A lens apparatus for use in a shearographic imaging system wherein light rays from a point light source pass through the lens apparatus, strike an object to be imaged, and reflect from the object to a shearographic camera, the lens apparatus comprising:

a receptacle defining a generally planar rectangular chamber therein, the receptacle fixed relative to the light source, object and camera;

a lens frame;

a circular solid lens in the lens frame, the lens and lens frame together forming one side of the planar chamber;

a window frame;

a thin planar window in the window frame, the window and window frame together defining another side of the planar chamber faced toward the solid lens;

a pair of opposed elongated wall sections of the receptacle for connecting the frames together;

the receptacle defining narrow rectagular openings at the upper and lower ends thereof, the periphery of the rectangular openings being formed by the frames and the wall sections;

a dump door sealingly closing the rectangular opening at the lower end of the chamber, the door movable relative to the receptacle to open the lower end of the chamber;

means for supplying gas to the chamber, the supplying means including a pressurized source of gas and a gas transfer means for communicating the source of gas to the rectangular opening at the upper end of the chamber, the gas transfer means including a duct whose proximal end is mated with the rectangular opening at the upper end of the chamber and whose distal end is communicated to the source of gas, the duct gradually flaring outward at the proximal end, thereby reducing turbulence in the flow of gas from the source of gas into the receptacle;

a vent in the gas transfer means for allowing gas to escape from the chamber;

a two-way valve in the gas transfer means having a first position wherein the two-way valve simultaneously shuts the vent and opens communication between the source of gas and the receptacle, the two-way valve having a second position wherein the two-way valve simultaneously opens the vent and shuts off communication between the source of gas and the receptacle;

a pressurized source of liquid;

a liquid transfer means for communicating the pressurized source of liquid to the receptacle, the liquid transfer means defining a liquid entry port in the receptacle located at the lower end of the receptacle;

a shut off valve in the liquid transfer means to control the flow of liquid through the liquid transfer means.

2. The apparatus of claim 1 further including means to close the shut off valve after the shut off valve has opened and permitted the receptacle to fill with liquid.

3. The apparatus of claim 1 further including means to place the two-way valve in its first position when the door moves to open the receptacle.

4. The apparatus of claim 3 further including means to place the two-way valve in the second position when the door moves to close the receptacle and the shut off valve is open.

5. The apparatus of claim 3 including means to keep the valves in the disposition of claim 3 for a predetermined time after liquid drains from the receptacle, whereby a downward gas stream passes through the receptacle to dry the receptacle.

6. The apparatus of claim 1 wherein the receptacle has an relatively constant cross-sectional area from its upper end to its lower end, the cross-sectional area varying by no more than 25 percent.

7. The apparatus of claim 6 wherein the inner peripheral surface of the receptacle is smooth and continuous.

8. The apparatus of claim 7 wherein the height of the chamber is equal to a chosen diameter of either the window or the lens, the chosen diameter being no smaller than the remaining diameter.

9. The apparatus of claim 8 wherein the distance between the wall sections is equal in distance to the chosen diameter.

10. The apparatus of claim 1 wherein the portion of the chamber bordered by the lens and window forms a plano-convex lens when filled with a transparent fluid.

11. The apparatus of claim 1 wherein the liquid transfer means defines a liquid entry port at the lower end of the receptacle, whereby intermixing of gas and liquid in the chamber is minimized after liquid begins replacing gas in the chamber.

12. A lens apparatus for an imaging system wherein rays from a light source pass through the apparatus, reflect from an object, and enter a camera, the apparatus comprising:
 a lens frame;
 a lens in the lens frame;
 a window frame;
 a window in the window frame;
 two opposed walls of the receptacle to connect the frames together to form a receptacle fixed relative to the light source;
 the receptacle defining upper and lower openings at the upper and lower ends of the receptacle, respectively;
 means at the lower end of the receptacle for dumping fluid from the receptacle;
 means for supplying a first fluid to the receptacle, the supplying means including a source of first fluid and a first transfer means for communicating the source of first fluid to the upper opening, the first transfer means including a duct with one end flared and mated with the upper opening;
 a vent in the first transfer means to allow the first fluid to escape from the receptacle;
 a two-way valve in the first transfer means having a first position where the two-way valve shuts the vent and communicates the source of first fluid to the receptacle, the two-way valve having a second position where the two-way valve opens the vent and stops flow between the source of the first fluid and the receptacle;
 a source of a second fluid;
 a second transfer means for communicating the source of second fluid to the receptacle;
 a shut off valve in the second transfer means to control the flow of the second fluid through the second transfer means.

13. The apparatus of claim 12 wherein the first fluid has a different index of refraction than the second fluid.

14. The apparatus of claim 13 wherein the fluid in the receptacle is in direct contact with the window and the lens.

15. In an optical method of analyzing strain of a flexible object, the method comprised of: making a first shearographic image of the object using a point source of coherent light whose rays are caused to radiate away from a first central point S1; making a second shearographic image of the object wherein the rays of the point source are caused to radiate away from a second central point S2; superimposing the second shearographic image on the first shearographic image to produce one composite shearographic image having a first sequence of fringes with monotonically increasing fringe order numbers; stressing the object; re-illuminating the object with the point source of coherent light whose rays radiate away from S1 while making a third shearographic image of the object; making a fourth shearographic image of the object when the rays of the point source radiate away from the second central point S2; superimposing the fourth shearographic image on the third shearographic image to produce another composite shearographic image having a second sequence of fringes having increasing fringe order numbers, and then comparing the position relative to the object of the first sequence of fringes and second sequence of fringes;
 the improvement to the optical method comprising:
 providing a hybrid lens assembly having a solid lens and an exchangeable lens made of a first fluid material trapped against one side of the solid lens, the first fluid material being replaceable by a second fluid material having a different index of refraction from the first material, one of the fluid materials being a gas and the other fluid material being a liquid,
 placing the hybrid lens assembly between the point source of light and the plate so that rays of light from the point source are refracted by the hybrid lens assembly before striking the plate, whereby the rays of light from the point source appear to diverge from a first virtual point source at the first central point S1;
 making the first shearographic image of the object while the first fluid material is trapped against the solid lens;
 after making the first shearographic image of the object, replacing the first fluid material with the second fluid material, whereby the rays of light from the point source passing through the hybrid lens appear to diverge from a second virtual point source at the second central point S2;
 making the second shearographic image of the object while the second fluid is trapped against the solid lens;
 after making the second shearographic image of the object, replacing the second fluid material with the first fluid material;
 making the third shearographic image of the plate while the first fluid material is trapped against the solid lens;
 after making the third shearographic image of the object, replacing the first fluid material with the second fluid material;

making the fourth shearographic image of the object while the second fluid is trapped against the solid lens.

16. The method of claim 15 wherein the hybrid lens assembly is comprised of:
    A receptacle defining a generally planar rectangular chamber therein, the receptacle fixed relative to the light source, object and camera;
    a lens frame;
    the solid lens being a circular solid lens in the lens frame, the solid lens and lens frame together forming one side of the planar chamber;
    a window frame;
    a thin planar window in the window frame, the window and window frame together defining another side of the planar chamber faced toward the solid lens;
    a pair of opposed elongated wall sections of the receptacle for connecting the frames together;
    the receptacle defining narrow rectangular openings at the upper and lower ends thereof, the periphery of the rectangular openings being formed by the frames and the wall sections;
    a dump door sealingly closing the rectangular opening at the lower end of the chamber, the door movable relative to the receptacle to open the lower end of the chamber;
    means for supplying gas to the chamber, the supplying means including a pressurized source of gas and a gas transfer means for communicating the source of gas to the rectangular opening at the upper end of the chamber, the gas transfer means including a duct whose proximal end is mated with the rectangular opening at the upper end of the chamber and whose distal end is communicated to the source of gas, the duct gradually flaring outward at the proximal end, thereby reducing turbulence in the flow of gas from the source of gas into the receptacle;
    a vent in the gas transfer means for allowing gas to escape from the chamber;
    a two-way valve in the gas transfer means having a first position wherein the two-way valve simultaneously shuts the vent and opens communication between the source of gas and the receptacle, the two-way valve having a second position wherein the two-way valve simultaneously opens the vent and shuts off communication between the source of gas and the receptacle;
    a pressurized source of liquid;
    a liquid transfer means for communicating the pressurized source of liquid to the receptacle, the liquid transfer means defining a liquid entry port in the receptacle located at the lower end of the receptacle;
    a shut off valve in the liquid transfer means to control the flow of liquid through the liquid transfer means.

17. The method of claim 15 wherein the hybrid lens assembly is comprised of:
    a lens frame, the solid lens being in the lens frame;
    a window frame;
    a window in the window frame;
    two opposed walls of the receptacle to connect the frames together to form a receptacle fixed relative to the light source;
    the receptacle defining upper and lower opening at the upper and lower ends of the receptacle, respectively;
    means at the lower end of the receptacle for dumping fluid from the receptacle;
    means for supplying a first fluid to the receptacle, the supplying means including a source of the first fluid and a first transfer means for communicating the source of the first fluid to the upper opening, the first transfer means including a duct with one end flared and mated with the upper opening;
    a vent in the first transfer means to allow the first fluid to escape from the receptacle;
    a two-way valve in the first transfer means having a first position where the two-way valve shuts the vent and communicates the source of the first fluid to the receptacle, the two-way valve having a second position where the two-way valve opens the vent and stops flow between the source of the first fluid and the receptacle;
    a source of the second fluid;
    a second transfer means for communicating the source of the second fluid to the receptacle;
    a shut off valve in the second transfer means to control the flow of the second fluid through the second transfer means.

* * * * *